Dec. 21, 1943.   W. J. JACOBSSON   2,337,106
BLOWPIPE HEAD
Filed July 24, 1940
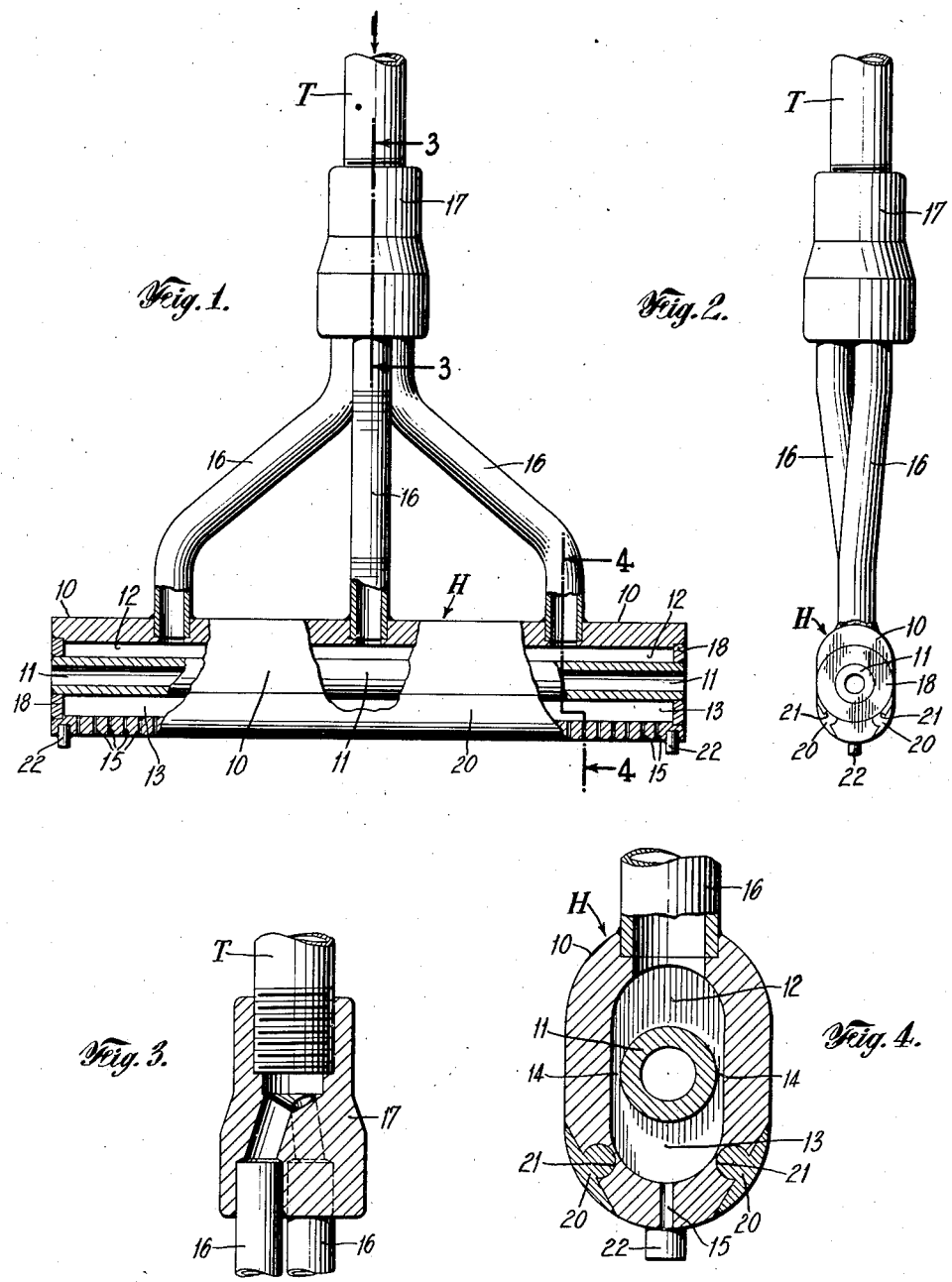
INVENTOR
WILGOT J. JACOBSSON
BY
ATTORNEY Patented Dec. 21, 1943

2,337,106

UNITED STATES PATENT OFFICE 2,337,106

BLOWPIPE HEAD

Wilgot J. Jacobsson, Plainfield, N. J., assignor to Union Carbide and Carbon Corporation, a corporation of New York Application July 24, 1940, Serial No. 347,195

12 Claims. (Cl. 158—27.4)

This invention relates to a blowpipe head adapted to produce a plurality of high temperature heating flames, and more particularly to such a blowpipe head useful in removing adhering material from the surface of an article.

A single high temperature heating flame, or a plurality of high temperature heating flames, by the latter of which a greater area of surface can be treated in a shorter time, can be used effectively in the removal of paint, scale, rust, or other adhering material from a surface of an article, particularly a metal article.

Rust normally has a brown color and ordinarily forms on a steel or other ferrous metal article while the article is exposed to the weather at normal temperatures. Rust cannot be removed by heating alone, but heating sufficiently to cause the color of rust to change from brown to black increases to a considerable degree the ease with which the rust may be removed by a wire brush or similar device. A possible explanation of this fact is that ordinary rust is a brown ferrous oxide, $Fe_2O_3$, containing considerable moisture or water of crystallization, and heating it not only drives off moisture and water of crystallization, but also causes a chemical reaction by which the rust changes to an anhydrous black ferric oxide, $Fe_3O_4$. The latter apparently adheres less tenaciously to the surface beneath, and thus is more easily removed.

Scale may be removed by heat, but in a slightly different manner. A sufficient amount of heat, applied relatively quickly, will cause a differential expansion between the scale and the surface underneath, or between the top and bottom of the scale, the latter effect being the more desirable since certain types and thicknesses of scale cannot be effectively removed by causing the former to take place. The differential expansion of the scale causes the scale to become loosened, and particularly when a differential expansion between the top and bottom of the scale is produced, the scale will pop or fly off in relatively large chunks, since the bottom of the scale is not heated sufficiently to lose its brittleness. Of the two principal types of scale—the first being a gray scale formed at quite high temperatures, of the order of 2200° F. and produced during hot forging, rolling, etc., and the second being a black scale formed at lower temperatures, such as those around the critical range and up to 1600° F. and produced during hardening, annealing, and cold forging and rolling—the first type is normally thicker but the second is more tenacious and thus more difficult to remove. Removal of scale is a problem of particular importance in the processing of steel in a mill. Blooms, billets, bars, etc., after passing through a rolling mill, are normally covered with either or both types of scale, and such scale must be removed in order to ascertain by inspection the extent of defects, such as slag inclusions, which themselves must be removed. Such scale can be removed most effectively and quickly by moving a plurality of high velocity and high temperature heating flames along the surface of the bloom or billet to effect a differential expansion between the top and bottom of the scale itself, even when the bloom or billet is relatively warm, although difficulty is usually experienced when the scale and bloom or billet are both above 700° F. because of the ductility and loss of brittleness of the scale and also its tendency to fuse in place when heated above such temperatures.

Another field of considerable commercial importance is the preparation of metal or other articles for painting. High temperature heating flames are used advantageously in the removal of an old coat of paint prior to repainting, or in the removal of rust and scale from castings which have been exposed to the weather for some time, or rust and scale combined with dirt and grease, prior to painting. An outstanding advantage in the removal of such rust, scale and other adhering material in this manner lies in the fact that substantially all moisture is driven off. A coat of paint applied to a surface so treated and especially while the surface is still warm, remains longer, does not flake off in spots, and adheres more tenaciously. This is probably due to the absence of moisture under the paint after it is applied, and also due to the decrease in surface tension of the paint when warmed by the surface and the resultant greater initial adherence of the paint to the surface. In addition to the treatment of castings or fabricated articles in a shop prior to application of an initial coat of paint, the removal of adhering material by high temperature heating flames is particularly advantageous in the case of bridges, trestles, and other outdoor structures which are to be repainted, or painted for the first time. Also, material adhering to metal surfaces of boats, both prior and subsequent to initial painting, is advantageously removed by flame treatment, particularly in corners, around rivets, etc.—i. e. those places difficult to reach and clean or treat by other methods.

A consideration of particular importance in such surface cleaning operations is the relative size and weight of the heating apparatus and the blowpipe head which it includes. Because the apparatus is usually manually operated and used in a variety of positions and on many types of surfaces, any reduction in weight of the apparatus or increase in compactness of the head adds to the ease and convenience of handling and reduces the physical labor involved on the part of the operator in moving the apparatus about. Furthermore, the blowpipe head is subject to much wear due to sliding over rough surfaces, and is also likely to receive rough treatment, such as in passing over rivets, or when used in corners, etc. Also, when used without interruption for a long period of time, the head tends to become overheated with possible resulting damage to the head and/or pre-ignition of the combustible mixture before it reaches the discharge outlets.

Among the objects of this invention are to provide a novel blowpipe head for producing a plurality or row of high temperature heating flames; to provide such a blowpipe head which is light in weight and compact in construction; to provide a blowpipe head useful in apparatus for removing adhering material from the surface of an article, such head being protected from the effects of wear; to provide such a blowpipe head which may be manufactured at a minimum cost; and to provide such a blowpipe head in which the combustible mixture is distributed to a series of outlets, but in which the tendency for the head to become overheated is reduced. Other objects and novel features of this invention will become apparent from the following description and accompanying drawing, in which:

Fig. 1 is a front elevation of apparatus including a blowpipe head constructed in accordance with this invention, the head being partly broken away to show the interior construction;

Fig. 2 is a side elevation of the apparatus of Fig. 1;

Fig. 3 is a partial vertical sectional view taken along line 3—3 of Fig. 1, illustrating the construction of a combustible mixture distributing header forming a part of the apparatus of Fig. 1; and Fig. 4 is an enlarged vertical sectional view, taken through the head itself, along line 4—4 of Fig. 1.

As shown in Fig. 1, a blowpipe head H, constructed in accordance with this invention, is adapted to direct a row of high temperature heating flames against adhering material on the surface of an article. The head H as illustrated is so constructed that the combustible mixture which produces the heating flames is preheated during passage therethrough and this is of advantage where it is desired to heat the gases concerned. The head H includes a relatively long, elongated body 10, which is preferably formed from a tube of copper, brass or other ductile and suitable metal, the sides of which are flattened, as shown in Fig. 4. An elongated chamber extends centrally through the body, this chamber having side walls spaced more closely together than the top and bottom walls, due to the flattened sides of the body or tube 10. A baffle 11, preferably tubular in form, divides the chamber into two smaller chambers or what may be identified as an upper passage 12 and a lower passage 13. The combustible mixture flows from upper passage 12 to the lower passage 13 through a pair of long, narrow, slots or metering orifices 14 formed between the inner side walls of body 10 and tubular baffle 11. From the lower passage 13, the combustible mixture is discharged through a longitudinal row of outlets 15, which are drilled in the lower side of body 10.

Outlets 15 are spaced relatively close together so that the heating flames tend to overlap and simulate a single wide ribbon-like flame. Slots or elongated ribbon-like passages 14 cause a relatively high pressure to be built up in upper passage 12 and an equalized distribution of the combustible mixture to lower passage 13 and outlets 15. Three inlet tubes 16, leading from a header 17 to upper passage 12, also assist in providing a more even distribution of the combustible mixture to the outlets. Inlet tubes 16 may be secured in any suitable gas-tight manner to header 17 and body 10, such as by brazing, welding, or silver soldering, and the ends of body 10 closed by plugs 18 which are similarly secured to body 10 and baffle 11, leaving the ends of baffle 11 open.

It will be understood that body 10 may be made in any other suitable manner, in addition to the above-described manner of flattening a tube, and that baffle 11 may have a shape other than tubular, or even may be solid, and that the relative shaping of the body and the baffle may be reversed so that the body is rounded and the baffle is flattened thereby to attain the structure described above, namely, upper and lower passages or chambers joined together by elongated ribbon-like passages.

Also, if desirable, or necessary, a cooling medium, such as compressed air may be circulated through the hollow baffle; although in certain instances, as for example when propane is utilized, preheating the combustible mixture may be desirable.

A combustible mixture of gases may be supplied to the header 17 from a tube T of any conventional type of blowpipe. Such blowpipes ordinarily include a suitable mixer and valves for regulating the flow to the mixer of a combustion-supporting gas and a combustible gas, such as oxygen and acetylene, respectively.

While the heat conductivity of the material such as copper, of which body 10 is made, may be in some instances advantageous from the standpoint of greater preheating of the combustible mixture, such material is relatively soft and is particularly subject to wear while sliding over a rough surface. Consequently, the head is provided with a pair of side skids 20 which are formed of a suitable material, such as a tungsten-cobalt-chromium alloy of the type known as "Stellite," which is more resistant to heat, wear, and abrasion than copper or brass. Side skids 20 are preferably formed by casting; and, as shown in Fig. 4, are provided with laterally extending tongues which fit into longitudinal dovetail grooves 21 machined in the lower sides of body 10. As illustrated, grooves 21 are substantially circular in cross-section, but any other suitable shape of groove may be used. Side skids 20 may be slid into place from the end of the head, and further secured in position by being silver soldered or welded to the body 10, as indicated.

To space the head the correct distance from the work, relatively short spacing studs 22, each formed of the same material as skids 20 may be secured in a suitable manner, such as by brazing or welding, in holes provided for the purpose adjacent each end of body 10 and adjacent opposite ends of the row of outlets 15. During use, the head rides on studs 22, or on studs 22 and one of skids 20, in the latter instance the head being inclined at an angle of about 45° with respect to the surface of the work. The head H is preferably pulled along the surface, so that loosened scale or other material will not be encountered after having been removed.

From the foregoing, it will be apparent that there is provided by this invention a blowpipe head useful in apparatus for removing adhering material by heating flames, such blowpipe head being light in weight and compact in structure, as well as being relatively cheap to construct and easy to manufacture. Although the blowpipe head of this invention has been described particularly with reference to its use in descaling and similar operations, it will be understood that the head and the principles of construction thereof are useful in connection with blowpipe heads for flame hardening or carrying out other operations involving the use of high temperature heating flames. It will also be understood that wide variations in the shape, size, and constructional features of the head are permissible, and that other variations may be made which will not depart from the spirit and scope of this invention, as defined in the appended claims.

What is claimed is:

1. A blowpipe head for producing a plurality of high temperature heating flames, comprising an elongated metal body having a chamber formed therein; means for supplying a combustible mixture of gases to the upper portion of said chamber; a plurality of outlets leading from the lower portion of said chamber; and a baffle disposed within said chamber and adapted to divide said chamber into upper and lower passages, said baffle being hollow so that a cooling medium may be circulated therethrough.

2. A blowpipe head for producing a plurality of high temperature heating flames as defined in claim 1, in which said baffle is of such a size and so disposed relatively to said chamber that at least one narrow elongated slot connecting said upper and lower passages is formed between said baffle and the inner surface of said chamber.

3. A blowpipe head for producing a plurality of high temperature heating flames as defined in claim 1, including means for supplying a combustible mixture of gases to a plurality of substantially equally spaced points along said upper passage.

4. A blowpipe head for producing a row of high temperature heating flames comprising an elongated metal body having a chamber formed therein, at least the central portion of the side walls of said chamber being spaced more closely together than the top and bottom walls of said chamber; a row of outlets leading from the lower portion of said chamber; means for supplying a combustible mixture of gases to the upper portion of said chamber; and a hollow baffle, through which a cooling medium may be circulated disposed within said chamber and dividing said chamber into upper and lower passages, said baffle forming, with the side walls of said chamber at the narrow portion thereof, relatively long and narrow restricted orifices connecting said upper and lower passages.

5. A blowpipe head for producing a row of high temperature heating flames as defined in claim 4, in which said body comprises a tube having flat sides.

6. A blowpipe head for producing a row of high temperature heating flames as defined in claim 4, in which said baffle comprises a hollow tube, the ends of which are open to the atmosphere to permit a circulation of air therethrough.

7. For use in apparatus for removing adhering material from a surface of an article by the application of high temperature heating flames, a blowpipe head having an elongated body provided with a row of outlets for directing high temperature heating flames against such material, said body having a chamber in the interior thereof and said plurality of outlets leading from the lower portion of said chamber and being spaced sufficiently close together so that said high temperature heating flames simulate a single wide, ribbon-like flame; means for supplying a combustible mixture of gases to the upper portion of said chamber; a hollow baffle disposed within said chamber and extending longitudinally thereof, said baffle dividing said chamber into upper and lower passages and being spaced from the side walls of said chamber to provide on either side of said baffle relatively long and narrow restricted orifices connecting said upper and lower passages; and plugs secured to said body and said baffle at each end thereof, said plugs closing the ends of said chamber but leaving the ends of said hollow baffle open to the atmosphere to permit a circulation of air therethrough.

8. A manually operable light weight and compact blowpipe head which includes an elongated body formed of a flattened light weight ductile metal tube with flattened side walls and a rounded top and bottom, a tubular baffle longitudinally and centrally disposed in said body so that elongated thin ribbon-like passages are formed longitudinally between the baffle and the body, and so that upper and lower gas distribution chambers are formed above and below said baffle extending longitudinally of said body from one end to the other, said tubular baffle having open ends and being adapted for the circulation of a cooling medium therein, end plugs at each end of said body closing the same and supporting said baffle in fixed relation thereto but not closing said baffle, inlet feeding means to feed oxygen and combustible gas to said upper chamber, and uniformly distributed discharge means to discharge said oxygen and said gas from said lower chamber longitudinally along the bottom of the same thereby to form an evenly distributed elongated high temperature ribbon-like flame extending from one end of the body to the other.

9. A light weight and compact blowpipe head which includes a light weight ductile metal elongated tubular body member, a tubular hollow baffle member longitudinally and centrally disposed in said body member with one of said members having flattened side walls so that elongated thin ribbon-like passages are formed longitudinally between the baffle member and the body member, and so that upper and lower gas distribution chambers are formed above and below said baffle extending longitudinally of said body from one end to the other, said tubular baffle having open ends and being adapted for the circulation of a cooling medium therein, end plugs at each end of said body member closing the same and supporting said baffle in fixed relation thereto but not closing said baffle member, inlet feeding means to feed oxygen and combustible gas to said upper chamber, and uniformly distributed discharging means to discharge said oxygen and said gas from said lower chamber longitudinally along the bottom of the same thereby to form an evenly distributed elongated high temperature ribbon-like flame extending from one end of the body to the other.

10. A blowpipe head for producing a plurality of high temperature heating flames, comprising an elongated metal body having a chamber formed therein; means for supplying gases for said flames to the upper portion of said chamber; a plurality of outlets leading from the lower portion of said chamber; and a baffle disposed within said chamber and adapted to divide said chamber into upper and lower passages, said baffle being shaped to conduct a cooling medium therethrough.

11. A blowpipe head for producing a plurality of high temperature heating flames, comprising an elongated metal body having a chamber formed therein; means for supplying combustible gas to said chamber; a row of gas outlets leading from the lower portion of said chamber; said body being of heat-conductive metal which is relatively soft and subject to wear, and having longitudinal undercut grooves extending lengthwise of said row of gas outlets, one along each side of said row; and a pair of preformed side skids of metal which is resistant to wear and to oxidation at high temperatures, said skids severally having integral dovetailed portions disposed in said undercut grooves and slid endwise into the latter to resist removal of the skids by transverse thrust in either direction during use of said head and to eliminate extra fastening means or welding to hold such skids in place; said body and said chamber being of symmetrical cross section, and said grooves and said skids being symmetrically located on opposite sides of the plane of said gas outlets, whereby said head may be reversed and operated equally well with either of said skids in engagement with the work.

12. A blowpipe head for producing a plurality of high-temperature heating flames, comprising an elongated metal body having a similiarly elongated chamber formed therein; means for supplying combustible gas to said chamber; a row of gas outlets leading from the lower portion of said chamber; said body being of heat conductive metal which is relatively soft and subject to wear, and having longitudinal undercut grooves extending lengthwise of said row of gas outlets, one along each side of said row; and a pair of side skids of metal which is resistant to wear and oxidation at high temperatures, said skids severally having integral dovetailed portions disposed in said undercut grooves to resist removal of the skids by transverse thrust in either direction during use of said head and thereby to hold such skids in place; said grooves and said skids being symmetrically located on opposite sides of the plane of said gas outlets, whereby said head may be reversed and operated equally well with either of said skids in engagement with the work.

WILGOT J. JACOBSSON.